United States Patent
Zhang et al.

(10) Patent No.: US 7,768,982 B2
(45) Date of Patent: Aug. 3, 2010

(54) AUTONOMOUS AND HETEROGENEOUS NETWORK DISCOVERY AND REUSE

(75) Inventors: Tao Zhang, Fort Lee, NJ (US); Sunil Madhani, Austin, TX (US); Eric Van Den Berg, Hoboken, NJ (US); Yoshihiro Oba, Englewood Cliffs, NJ (US)

(73) Assignees: Toshiba America Research, Inc., Piscataway; Telcordia Technologies, Inc., Piscataway ( * ) Notice: Subject to any disclaimer, the term of this patent is extended or adjusted under 35 U.S.C. 154(b) by 301 days.

(21) Appl. No.: 11/531,736

(22) Filed: Sep. 14, 2006

(65) Prior Publication Data

US 2007/0171881 A1 Jul. 26, 2007

Related U.S. Application Data

(63) Continuation-in-part of application No. 11/267,590, filed on Nov. 7, 2005, application No. 11/531,736, filed on Sep. 14, 2006, which is a continuation-in-part of application No. 11/161,298, filed on Jul. 28, 2005, said application No. 11/267,590.

(60) Provisional application No. 60/625,106, filed on Nov. 5, 2004, provisional application No. 60/593,377, filed on Jan. 9, 2005, provisional application No. 60/670,655, filed on Apr. 13, 2005, provisional application No. 60/697,589, filed on Jul. 11, 2005, provisional application No. 60/596,301, filed on Sep. 14, 2005.

(51) Int. Cl.
*H04W 4/00* (2009.01)
*H04L 12/26* (2006.01)
*H04W 36/00* (2009.01)

(52) U.S. Cl. .................. 370/338; 370/252; 370/328; 455/436

(58) Field of Classification Search .................. 370/338
See application file for complete search history.

(56) References Cited

U.S. PATENT DOCUMENTS

| | | | |
|---|---|---|---|
| 6,621,423 B1* | 9/2003 | Cooper et al. | 340/995.24 |
| 6,754,470 B2* | 6/2004 | Hendrickson et al. | 455/67.11 |
| 6,850,763 B1* | 2/2005 | Naqvi et al. | 455/448 |
| 2002/0118656 A1* | 8/2002 | Agrawal et al. | 370/329 |
| 2003/0014091 A1* | 1/2003 | Rastegar et al. | 607/61 |
| 2003/0172070 A1* | 9/2003 | Sawadsky et al. | 707/10 |
| 2003/0208568 A1* | 11/2003 | Inoue et al. | 709/220 |
| 2004/0032845 A1* | 2/2004 | Chen | 370/338 |
| 2004/0081120 A1* | 4/2004 | Chaskar | 370/328 |
| 2004/0106441 A1* | 6/2004 | Kazakevich et al. | 455/574 |
| 2005/0130659 A1* | 6/2005 | Grech et al. | 455/436 |
| 2005/0147068 A1* | 7/2005 | Rajkotia | 370/338 |
| 2006/0041534 A1* | 2/2006 | Atwell | 707/3 |
| 2006/0104211 A1* | 5/2006 | Islam et al. | 370/252 |

* cited by examiner

*Primary Examiner*—Lester Kincaid
*Assistant Examiner*—Yu (Andy) Gu
(74) *Attorney, Agent, or Firm*—Watchstone P&D, PLLC

(57) ABSTRACT

This application sets forth, among other things, a new approach for real time collection, discovery, and sharing of network and user information, which we refer to as Autonomous Collaborative Information Collection, Discovery, and Sharing (AC-CDS). It is autonomous because regular mobile users and devices act autonomously to collect information and make the information available to others. It is collaborative as the autonomous actions of the mobile users and devices help each other to discover the information they want.

22 Claims, 3 Drawing Sheets

Concept, architecture, and operation of AC-CDS.

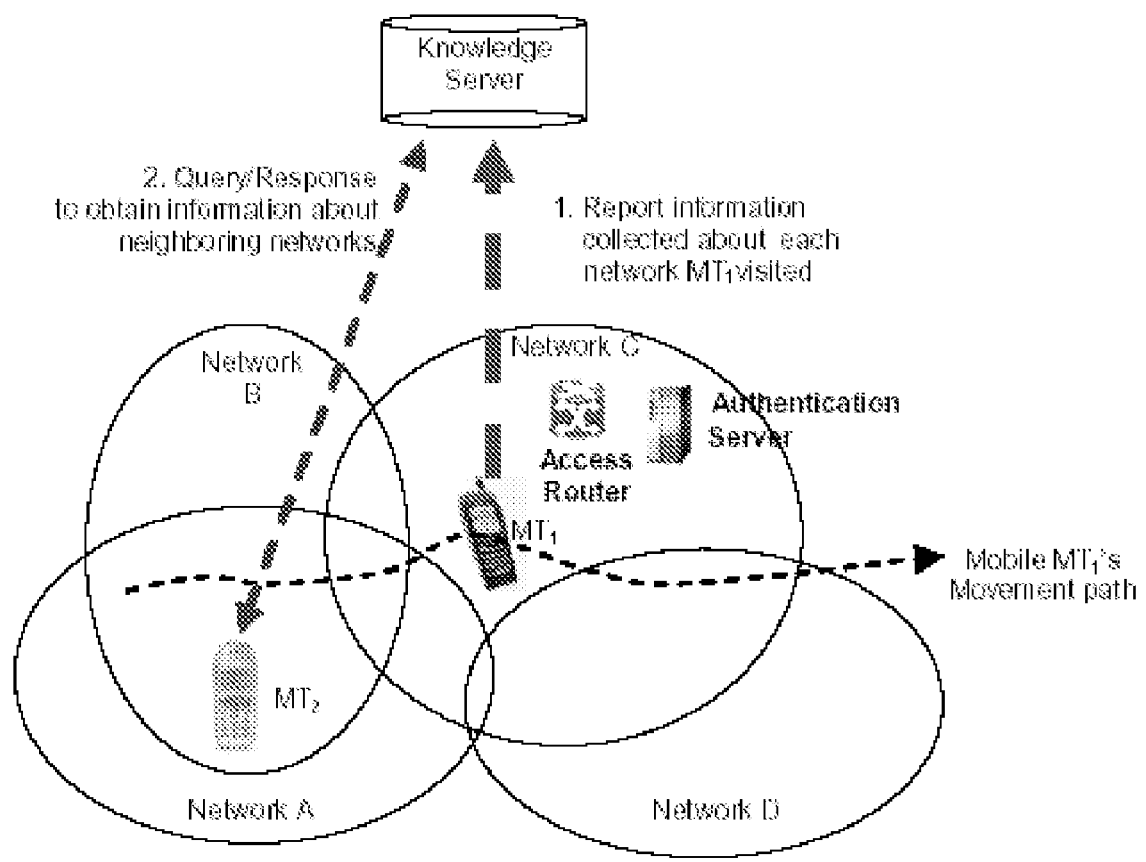
Figure 1: Concept, architecture, and operation of AC-CDS.

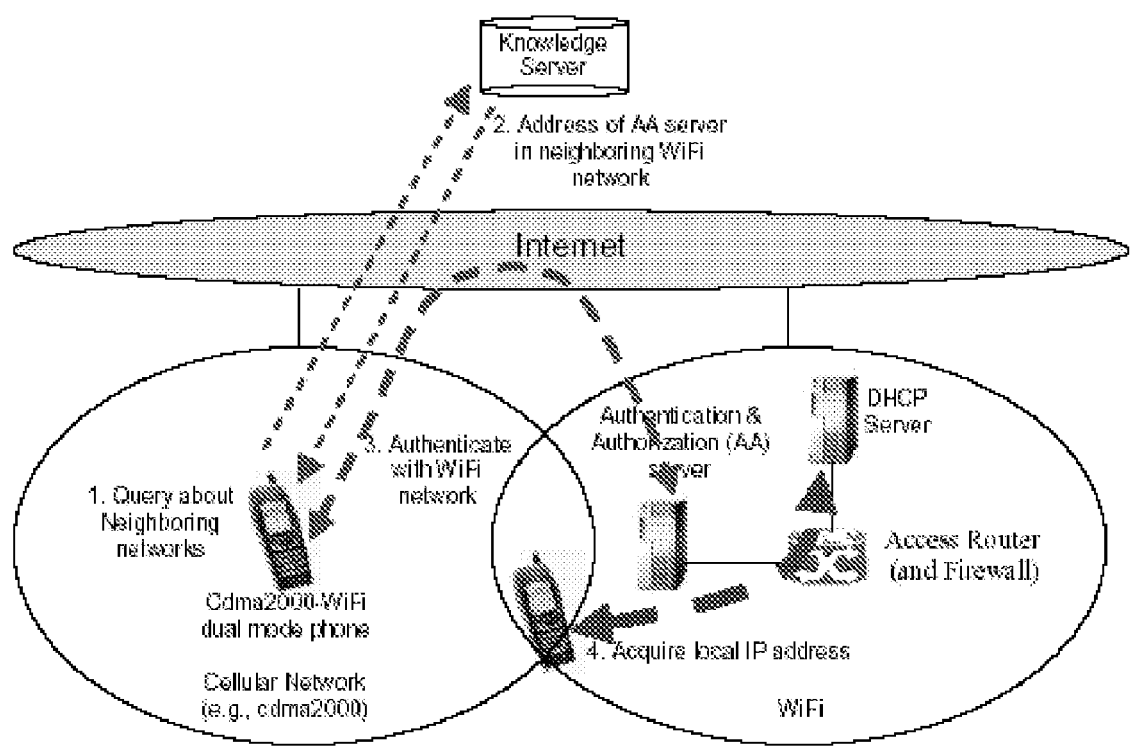
Figure 2: Sample application of AC-CDS for fast handoff.

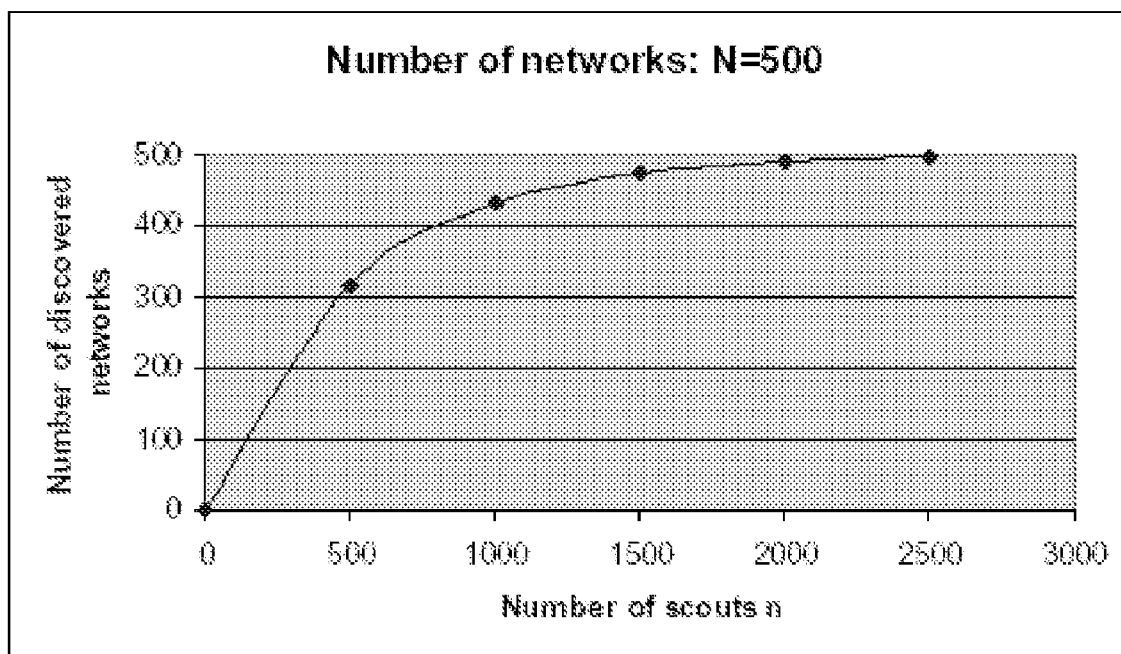
Figure 3: Networks discovered with a given number of n scouts

AUTONOMOUS AND HETEROGENEOUS NETWORK DISCOVERY AND REUSE

The present application is a continuation-in-part under 35 U.S.C. 120 of non-provisional application Ser. No. 11/267,590 filed on Nov. 7, 2005, entitled Network Discovery Mechanisms, which claims priority to prior provisional applications (1) 60/625,106 (filed Nov. 5, 2004), (2) 60/593,377 (filed Jan. 9, 2005), (3) 60/670,655 (filed Apr. 13, 2005), (4) 60/697,589 (filed Jul. 11, 2005). In addition, the present application is a continuation-in-part under 35 U.S.C. 120 of non-provisional application Ser. No. 11/161,298 (filed Jul. 28, 2005), entitled Peer-To-Peer Network And User Information Discovery And Sharing For Mobile Users And Devices. In addition, the present application claims priority under 35 U.S.C. 119 to provisional application Ser. No. 60/596,301 (filed on Sep. 14, 2006) entitled Autonomous and Heterogeneous Network Discovery and Reuse. The entire disclosures of each-and-every one of the provisional and non-provisional U.S. patent applications set forth above in this paragraph are incorporated herein by reference in their entireties, as though recited herein in full.

BACKGROUND

1. Field of the Invention

The present application relates to wireless networking and, in some preferred embodiments, to systems and methods for mobile stations autonomous and heterogeneous network discovery and reuse, and, in some preferred embodiments to the discovery of networks and information regarding the networks, and, in some preferred embodiments, to methods of using information acquired by autonomous discovery to support proactive handover actions and/or the like.

2. General Background Discussion

Networks and Internet Protocol

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

With respect to IP (Internet Protocol), this is a protocol by which data can be sent from one device (e.g., a phone, a PDA [Personal Digital Assistant], a computer, etc.) to another device on a network. There are a variety of versions of IP today, including, e.g., IPv4, IPv6, etc. Each host device on the network has at least one IP address that identifies the host device's point of attachment to the IP networks.

IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. In the OSI and other similar models, IP is in Layer-3, the network layer.

Wireless Networks

Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, e.g., a single chip transceiver with an integrated transmitter, receiver and, if desired, other functions); an antenna; a processor; one or more audio transducers (for example, a speaker or a microphone as in devices for audio communications); electromagnetic data storage (such as, e.g., ROM, RAM, digital data storage, etc., such as in devices where data processing is provided); memory; flash memory; a full chip set or integrated circuit; interfaces (such as, e.g., USB, CODEC, UART, PCM, etc.); and/or the like.

Wireless LANs (WLANs) in which a mobile user can connect to a local area network (LAN) through a wireless connection may be employed for wireless communications. Wireless communications can include, e.g., communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB: RFCs are formal documents of the Internet Engineering Task Force (IETF). Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

In basic IP routing (i.e. outside mobile IP), typically, routing mechanisms rely on the assumptions that each network node always has a constant attachment point to, e.g., the Internet and that each node's IP address identifies the network link it is attached to. In this document, the terminology "node" includes a connection point, which can include, e.g., a redistribution point or an end point for data transmissions, and which can recognize, process and/or forward communications to other nodes. For example, Internet routers can look at, e.g., an IP address prefix or the like identifying a device's network. Then, at a network level, routers can look at, e.g., a set of bits identifying a particular subnet. Then, at a subnet level, routers can look at, e.g., a set of bits identifying a particular device. With typical mobile IP communications, if a user disconnects a mobile device from, e.g., the Internet and tries to reconnect it at a new subnet, then the device has to be reconfigured with a new IP address, a proper netmask and a default router. Otherwise, routing protocols would not be able to deliver the packets properly.

Network Discovery

In the evolution of wireless networking based on, e.g., wireless LAN (Local Area Network) and cellular technologies, and as mobility services prevail and people become increasingly mobile, it is more important for a mobile device to be able to find an appropriate point of network attachment that meets the application requirements and the characteristics of the mobile, in a timely, accurate and efficient manner. In this disclosure, this functionality is referred to as network discovery.

In this regard, network discovery can relate to, e.g., the discovery of information that the mobile station uses to access a network, such as, by way of example, a network attachment point identification (e.g., an L2 address and/or a geographical address of an access point), a MAC type (e.g., "IEEE 802.11g") of an access point, a security type (e.g., "WPA" or "PANA and IPsec") supported by an access point, a layer-3 type (e.g., "IPv4 only" or "IPv4/v6 dual stack"), a provider name, or the addresses of a server or an agent (e.g., PANA authentication agents, access routers, SIP servers and Mobile IP home agents).

While a variety of wireless systems and methods are known, there remains a need for improved systems and methods, related to, among other things, network discovery and reuse. The entire disclosures of each of the following background references are incorporated herein by reference:

[2] Microsoft Corporation, "Universal Plug and Play Device Architecture", http://www.upnp.orgl;

[3] Salutation Consortium, "Salutation Architecture Specification", Jun. 1, 1999

[4] Marco Liebsch and Ajoy Singh (editors), "Candidate Access Router Discovery", *Internet Draft draft-ietf-seamoby-card-protocol-06.txt*, Internet Engineering Task Force, June 2004;

[5] K. Arabshian, H. Schulzrinne, "GloServ: Global Service Discovery Architecture", *Mobiquitous* 2004, Boston;

[6] Tao Zhang, Eric van den Berg, Sunil Madhani, "Peer-to-Peer Information Discovery and Sharing Among Mobile Users and Devices", the 61*st IEEE Vehicular Technology Conference (VTC)*, 2005;

[7] Tao Zhang, Sunil Madhani, Ashutosh Dutta, Eric van den Berg, Yoshihiro Ohba, Kenichi Tauiuchi, Shantidev Mohanty, "Implementation and Evaluatoin of Autonomous Collaborative Discovery of Network Information", *the* 3*rd International Conference on Information Technology: Research and Education (ITRE* 2005), Taiwan;

[8] Tao Zhang, Sunil Madhani, Shantidev Mohanti, "Analysis of ACD: Autonomous Collaborative Discovery of User and Network Information", the 10*th IFIP International Conference on Personal Wireless Communications (PWC* 2005), Colmar, France, August 25-27.

[10] SOAP, Simple Object Access Protocol

[11] R. Durrett, "Probability: Theory and Examples", Third Edition, *Duxbury Advanced Series,* 2004;

[12] P. Flajolet, D. Gardy, L. Thimonier, "Birthday Paradox, Coupon Collectors, Caching Algorithms and Self-Organizing Search", *Discrete Applied Mathematics* 39, pp. 207-229, 1992.

SUMMARY OF THE PREFERRED EMBODIMENTS

The preferred embodiments of the present invention can significantly improve upon existing methods and/or apparatuses.

Mobile users and devices want to discover and share a growing range of information as the processing and storage capacities of mobile devices grow rapidly. For example, users may want to discover the locations of nearby networks and location-based dynamic information contents. A mobile device may want to know the existence and capabilities of neighboring networks and the parameters it needs use to access these networks. This allows the device to intelligently decide which network to use next, and to use its existing network connection to authenticate with a selected neighboring network before it enters the selected network's coverage area (hence significantly reducing handoff delays). Existing service discovery frameworks are not effective in discovering neighboring networks and location-based dynamic user information contents. This application sets forth a new approach for real time collection, discovery, and sharing of network and user information, which we refer to as Autonomous Collaborative Information Collection, Discovery, and Sharing (AC-CDS). It is autonomous because regular mobile users and devices act autonomously to collect information and make the information available to others. It is collaborative as the autonomous actions of the mobile users and devices help each other to discover the information they want.

According to some embodiments, a method for mobiles discovery of network information related to networks to be visited includes: having mobiles act as scouts and collect information in or related to the networks they visit as part of their use of the networks, and having the mobiles make the collected information available to other mobiles by reporting the collected information to a knowledge server, wherein the knowledge server maintains accumulated collected information reported by mobiles, and makes the accumulated collected information available to subscriber mobiles. In some examples, the method further includes having a mobile send a query to the knowledge server when it needs to discover information. In some examples, the method further includes arranging the knowledge server in a distributed or centralized manner. In some examples, the method further includes operating the knowledge server by a provider that is independent of network providers. In some examples, the method further includes that to reduce undesired reporting, when a mobile uses an information item it received from the knowledge server, it verifies the accuracy of the information, and if the information is accurate it does not report the same information when it later detects the information directly from the original source of the information. In some other examples, the method includes that to make information discovery independent of specific networking technologies and network providers, an application-layer standard protocol is used for communications between the mobiles and the knowledge server for information reporting and retrieval.

According to other embodiments of the invention, a mobile device configured to discover network information related to networks to be visited using a knowledge server includes: said mobile device being configured to act as a scout and collect information in or related to the networks it visits as part of its use of the networks, and said mobile device being configured to make the collected information available to other mobiles by reporting the collected information to a knowledge server that maintains accumulated collected information reported by mobiles, and said mobile being configured to send a query to said knowledge server when said mobile needs some of the accumulated collected information.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which:

FIG. 1 is an illustrative architectural diagram showing exemplary concept, architecture, and operation of AC-CDS according to some embodiments;

FIG. 2 is a schematic diagram showing a sample application of AC-CDS for fast handoff and demonstrating, among other things, how AC-CDS can be used to, e.g., allow a mobile device to authenticate with a target network before it even moves into the radio coverage area of the target network; and FIG. 3 is an illustrative chart showing networks discovered with a given number of n scouts.

DETAILED DESCRIPTION OF THE PREFERRED EMBODIMENTS

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

As the processing and storage capacities of mobile devices grow rapidly, mobile users and their communication devices (e.g., mobile phones, Personal Digital Assistants, notebook computers, and communication devices in moving vehicles) need to discover a growing range of information. Such information includes:

User-interest information (i.e., information of interest to human users): Examples include the existence, locations, and capabilities of nearby local area wireless networks (WLANs) (e.g., public hotspot networks using IEEE 802.11 or 802.16, and road-side wireless networks); network services (e.g., voice-over-IP services), networked devices (e.g., printers, displays); applications and software utilities; application contents including location-sensitive information and dynamically changing information (e.g., traffic accidents and road conditions).

Device-interest information: Emerging mobile devices want information, which may or may not be directly usable to human users, to better support mobility and mobile applications. For example, if a mobile device knows the addresses of the authentication server and the IP address server in a target network, it can authenticate with, and acquire an IP address from, the target network while it is still using its current network even before detecting the radio signal from the target network. This could significantly reduce handoff delays.

Often, mobile users and devices want to know not only information in or about the networks they are currently using, but also in and about neighboring networks. Here, a neighboring network is a nearby network that a user can move into next from its current network; its radio coverage area may or may not overlap with that of the current network.

We refer to mobile users and mobile devices simply as mobiles when there is no need to distinguish between a human user and a mobile device in our discussion.

Several service discovery frameworks exist today [1][2][3] [5]. They are designed for computers to discover network services such as shared network devices (e.g., printers, displays, and disks), software utilities, and database and files. The leading service discovery frameworks include Jini [1], Universal Plug and Play (UPnP) [2], and Salutation [3]. Jini allows devices and software components to form a distributed network system dynamically. It provides mechanisms for service construction, lookup, communication, and access. All services are registered with a central register. Clients locate services using a directory service referred to as the lookup service. Salutation [3] provides a method for applications, services and devices to describe and advertise their capabilities, and to find other applications, services and devices. The Salutation architecture has two major components: Salutation Manager and Transport Manager. Salutation Manager is a service broker. Each service provider registers its capability with a Salutation Manager. A client queries a Salutation Manager to find a service. The Salutation Managers coordinate with each other to locate the service for the client. The Transport Manager provides reliable transport of Salutation messages. UPnP [2] supports dynamic establishment of peer-to-peer network connectivity among user devices. It provides capabilities for a device to dynamically join a network, obtain an IP address, convey its capabilities upon request, and learns about the presence and capabilities of other devices. UPnP does not use central service registry.

These existing service discovery mechanisms focus on discovering network services and devices. They do not support the discovery of dynamic, location-based, or time-sensitive information (e.g., such as real-time traffic conditions and accidents). They do not support neighborhood discovery, i.e., discovering information in or regarding neighboring networks. For example, a device cannot use these methods to discover the existence of neighboring networks, network elements or user contents inside these neighboring networks. Furthermore, existing service discovery methods are not designed to support user-interest information discovery.

Recognizing the existing service discovery approaches' lack of ability to support neighborhood discovery, the Internet Engineering task Force (IETF) has been developing a Candidate Access Router Discovery (CARD) protocol [4] that allows mobile devices to discover the IP address and capabilities of access routers in neighboring networks. CARD, however, has the following limitations. First, it requires neighboring access routers to use the CARD protocol to dynamically exchange network information, which is difficult when neighboring networks belong to different network providers. Second, it requires all access routers to implement the CARD protocol to communicate with mobile devices, which is again a difficult proposition. Third, a mobile device can only obtain the information each network provider configures its CARD protocol to provide. Thus, the available information can vary significantly from network to network. This is unsuitable to support mobile devices that may need different information depending on their different networking capabilities and user applications. We advocate that future approaches for information discovery should allow mobile users and devices to:

Participate in the creation of information and share the information they accumulate with each other.

Discover dynamic, location-based information, and time-sensitive
information.

Discover information they want, not only what network or service providers think they may want.

Discover information in and about neighboring networks.

Discover information in a timely manner to support fast moving mobiles such as vehicles.

In addition, future information discovery and sharing approaches should not rely on local network providers and should be independent of radio technologies used in the networks.

Concept, Architecture, and Operation of AC-CDS:

In some preferred embodiments, we propose a new approach for real-time collection, discovery, and sharing of user- and device-interest information: Autonomous Collaborative Information Collection, Discovery, and Sharing (AC-CDS), which is designed to meet the requirements outlined in Section I. This approach is autonomous in the sense that mobile users and devices act autonomously to collect information they want and make the information available to other users and devices. It is collaborative as the autonomous actions made by the mobiles help each other to discover the information they want.

We use the network configuration shown in FIG. 1 to illustrate principles and operations of AC-CDS. The networks shown in FIG. 1 can be any type of wireless or wired networks including WLANs and cellular networks, and may belong to different network providers.

In this regard, FIG. 1 shows an illustrative concept, architecture, and operation of AC-CDS. With AC-CDS, regular mobile users and their communication devices act as scouts to collect information in and about the networks they visit as part of their routing use of the networks, and make the information they accumulate available to other users and devices. A mobile user or device can collect a broad range of information about the networks it detects or uses, without any special assistance from the network providers. For example, When a mobile device receives radio beacons from a wireless network, it can learn the existence, the rough location, the type, and some capabilities of the network.

Once a mobile device connects to a network successfully, The device will also know the addresses of the key network elements in the network, such as the addresses of the IP address servers and the authentication server (if authentication is required).

The human user will also know the user information contents he or she has found or used in the network.

Mobile users and devices can also detect dynamic events (e.g., traffic accidents) and accumulate information contents.

Mobile users and devices themselves may also be information creators. For example, a user may accumulate information in its mobile communication device about the points of attractions he/she recently just visited, and time-sensitive information about a point of attraction he/she is currently visiting (e.g., current waiting times), and makes the information available to other users.

Most existing service discovery mechanisms only allow a device to discover other devices and software that implements the same service discovery framework (e.g., UPnP or Jini). AC-CDS, however, allows network elements, software and applications, and user contents to be discovered without requiring them to implement any extra protocol for supporting the discovery. For example, a regular IP device can gather information about an IP access router simply by functioning as an IP device, using the standard router advertisement mechanisms used by the routers without requiring the routers to implement any extra service discovery mechanisms. Using other existing service discovery methods, a mobile device is "selfish" in the sense that it typically keeps any information it has learnt to itself, and the mobile is "memoryless" in the sense that it will discard the information after it no longer uses it. With AC-CDS, the information a mobile collects will be made available to other authorized users and devices.

To share the information, a mobile reports its collected information to a functional entity referred to as Knowledge Server. Other methods for information sharing may also be used. For example, a peer-to-peer neighboring network discovery method was recently presented in [6]. It should be understood by those in the art based on this disclosure that the terminology knowledge server encompasses any appropriate computer architecture, such as by way of example, a server computer, including, e.g., an Information Server as described in the above-referenced prior U.S. application entitled Network Discovery Mechanisms and the like.

The knowledge server maintains the information reported by all the mobiles that subscribe to its services, and makes the information available to all subscriber mobiles. When a mobile needs to discover any information, it queries the knowledge server. For example, as shown in FIG. 1, the first mobile MT1 traveled through networks A, B, and C and served as a scout to discover the existence of these networks, some network information (e.g., addresses of the access router, IP address server, and authentication server), and the fact that networks A and B, B and C are neighbors. It reports such information to the knowledge server. When mobile MT2 later moves into network B, it may query the knowledge server to find the IP address of the authentication server in a neighboring network to authenticate with the neighboring network before the actual handoff to the neighboring network. Knowledge servers can be distributed or centralized. They can be operated by a knowledge provider that is independent of network providers. A knowledge server only receives, and, hence, only needs to maintain, information that its subscribers are interested in. It only needs to maintain information regarding the locations and the networks its subscribers traveled. It can remove the information it stores regarding a network or geographical region when no user requests it any more in a given time period.

Each mobile user or device does not need to know what information other users or devices want. Instead, it collects the information it wants for itself. The information collected by all subscribing mobiles of the knowledge server will create a wealth of knowledge that satisfies the needs of every subscribing mobile. For example, let's say that mobile MT2 in FIG. 1 also observed a traffic accident while it was in network B, it reported the accident and its location to the knowledge server. When another mobile later enters network A or C, it can find out, by querying the knowledge server, not only the IP address of the authentication server in network B but also about the traffic accident.

Information collected by all the subscriber mobiles of the knowledge server will collectively satisfy the needs of all these subscriber mobiles even when the information collected by each mobile will never be useful to any other mobile. In such a case, the information collected by a mobile helps itself when it later needs to discover information regarding the networks that it may re-visit. For example, mobile MT1 in FIG. 1 has visited networks A, B, and C and reported the information it collected about these networks to the knowledge server. When it returns to network A later, it will be able to find the information it needs regarding network A's neighboring network B, by querying the knowledge server. Multiple mobiles may discover the same information and all report it to the knowledge server, which can lead to unnecessarily high information reporting traffic if no effort is taken to reduce the unnecessary reporting. On the other hand, the mobiles need to update the knowledge server frequently enough to keep the dynamic information stored on the knowledge server up to date. To balance the need to maintain up-to-date information and the need to reduce unnecessary reporting, we use a method described below.

Whenever a mobile uses an information item it received from the knowledge server, it verifies the accuracy of the information. If the information is accurate, it will not report the same information when it later detects the information directly from the original source of the information. For example, suppose that a mobile in network A obtained, from the knowledge server, the IP address of the authentication server in a neighboring network B. If the mobile used the address to authenticate with network B successfully, it knows that the address is up to date. Therefore, when it later moves into network B and learns this same IP address of the authentication server from network B, it will not report it to the knowledge server. On the other hand, if the mobile discovers that the IP address received from the knowledge server is wrong, or if the mobile simply didn't receive the requested IP address from the knowledge server, it will report the correct address after it moves into network B and learns it directly from network B. With the above approach, the information reporting frequency decreases naturally as the knowledge server accumulates more information about the networks. If all the information items are static, the reporting will automatically stop when the networks currently used by the knowledge server's subscribers have all been visited by the subscriber mobiles. To make information discovery independent of specific networking technologies and network providers, AC-CDS uses an application-layer standard protocol between the mobile and knowledge server for information reporting and retrieval. AC-CDS does not impose any special requirements on such an application-layer protocol. We used the Simple Object Access Protocol (SOAP) [10] in our testbed. When the knowledge server is operated by an application or service provider that is independent of the network providers, the application-layer protocol for information reporting and retrieval allows AC-CDS to support the discovery and sharing of information about heterogeneous networks that may belong to different network providers.

The information on the knowledge server should be stored in a standard and easy to access manner. We used RDF (Resource Description Framework) [9] for this purpose in our test-bed and a sample schema can be found in [7].

Sample Application of AC-CDS:

FIG. 2 shows a sample application of AC-CDS for fast handoff and illustrates how AC-CDS can be used to allow a mobile device to authenticate with a target network before it even moves into the radio coverage area of the target network.

Consider a dual-mode mobile phone with a cdma2000 and a WiFi network interface. Suppose that the phone is currently using the cdma2000 network and no WiFi network is available at the moment. To conserve battery power on the phone, it can power off its WiFi interface.

While using the cdma2000 network, the mobile phone can query the knowledge server to learn that a WiFi network is nearby and to discover the IP address of the Authentication and Authorization (AA) server in this target WiFi network. It can then use its cdma2000 network connection to go through the Internet to authenticate with the WiFi network without having to power on its WiFi interface. It can power on its WiFi interface when it moves close enough to the WiFi network. It does not need to perform authentication with the WiFi network during the handoff, thus significantly reducing handoff delay. The phone needs a local IP address from the target WiFi network to send packets over the target network. It can acquire a local address as soon as it successfully authenticates with the WiFi network without having to power on its WiFi interface, and activates this local address when the WiFi interface is powered on and the phone moves into the WiFi network. The phone may also wait until it starts the handoff process to acquire the local IP address.

Analysis:

The prior provisional application sets forth an illustrative and non-limiting analysis, which is incorporated herein by reference in its entirety. In brief, a noteworthy question is how long the initial learning period will be (i.e., the time it takes for scouts to discover all the networks of interest). Furthermore, how does the number of scouts impact the length of this initial learning period? The foregoing provisional application describes an analytical model and uses it to answer these questions. The volumes and costs of information reporting and retrieval connected with our approach are analyzed in [8].

As set forth in the provisional application, we first consider one scout and assume that the time it spends inside each network is a random variable and is independent of which network it moves into next. If the average time a scout spends in each network is the same and is denoted by m, the average initial learning period will be m times the average number of movements the scouts made before discovering all the networks. Here, we say a scout made a movement each time it moves out of a network. We focus on evaluating the number of movements a scout needs to make before discovering all the networks of interest.

As seen from both Equations (1) and (2) in the provisional application, these equations suggest that a small number of movements could be sufficient on average to discover a large number of networks.

It is noted scouts are simply regular users. In practice, a network is not discovered only when no user visits it. When no user visits a network, it typically means that it is not important for the network to be discovered. Once users start to visit the network, it will then be discovered naturally.

For illustration, FIG. 3 shows an illustrative chart showing networks discovered with a given number of n scouts.

As set forth above, this document sets forth a new framework that allows mobile users and their devices to collect, discover, and share user-interest and/or device-interest information. As seen by the analytical models set forth in the provisional application to evaluate the time it takes to collect information about networks in a geographical region, the results show that that a small number of scouts are typically sufficient to discover a large number of networks quickly.

Broad Scope of the Invention:

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A method for mobiles discovery of network information related to networks to be visited, comprising:
   collecting information using mobiles in or related to the networks that said mobiles acting as scouts visit as part of their use of the networks,
   sharing the collected information from the mobiles with other mobiles by reporting the collected information to a knowledge server,
   wherein the knowledge server maintains accumulated collected information reported by mobiles and makes the accumulated collected information available to subscriber mobiles,
   further including having a mobile send a query to the knowledge server when it needs to discover information,
   further including making information discovery independent of specific networking technologies and network providers using an application-layer standard protocol for communications between the mobiles and the knowledge server for information reporting and retrieval,
   further including having a mobile use the knowledge server information to allow the mobile to authenticate with a target network before it moves into a coverage area of the target network.

2. The method of claim 1, further including arranging the knowledge server in a distributed or centralized manner.

3. The method of claim 1, further including operating the knowledge server by a provider that is independent of network providers.

4. The method of claim 1, further including having the knowledge server only maintain information related to networks that its subscribers have traveled to within a given time period.

5. The method of claim 1, further including having a mobile collect a range of information about networks it detects or uses, without assistance from network providers.

6. The method of claim 1, further including having the mobiles act as information creators.

7. The method of claim 2, further including having a mobile user accumulate user-interest information in its mobile device related to points of attraction geographically within visited networks or time-sensitive information related to a point of attraction geographically within visited networks and make the information available to other users by transmitting the information to said knowledge server.

8. The method of claim 1, further including having the information collected by a mobile, transmitted to the knowledge server, and later retrieved by that mobile from the knowledge server such that it is used by that mobile itself when it later needs to discover information upon re-visiting the network.

9. The method of claim 1, wherein to reduce undesired reporting, when a mobile uses an information item it received from the knowledge server, it verifies the accuracy of the information, and if the information is accurate it does not report the same information when it later detects the information directly from the original source of the information.

10. The method of claim 1, wherein the knowledge server is operated by a provider that is independent of the network providers, and the application-layer protocol for information reporting and retrieval supports the discovery and sharing of information about heterogeneous networks that belong to different network providers.

11. The method of claim 1, wherein the information in the knowledge server is stored in at least one database in a standard and ready to access manner.

12. The method of claim 1, further including having the mobile use the knowledge server information to allow the mobile to authenticate with a target network that uses a first wireless interface for communication via a second wireless interface.

13. The method of claim 1, further including having the mobile use the knowledge server information to allow the mobile to authenticate with a target network before it moves into a coverage area of the target network, and wherein the mobile includes a cellular telephone interface and a WiFi network interface.

14. The method of claim 13, further including having the mobile power off its WiFi interface when the mobile is currently using the cellular telephone interface and no WiFi network is available, and having the mobile query the knowledge server to learn that a WiFi network is nearby and to discover information related to the target WiFi network.

15. The method of claim 13, further including having the mobile use its cellular phone network connection to go through the Internet to authenticate with the WiFi network without having to power on its WiFi interface.

16. The method of claim 15, further including having the mobile power on its WiFi interface when it moves close enough to the WiFi network, such that it does not need to perform authentication with the WiFi network during the handoff, thus significantly reducing handoff delay.

17. The method of claim 1, further including having said information in or related to networks include:
a) device-interest information, including IP addresses of network access points and IP addresses of authentication servers and security type supported by the access points; and
b) user-interest information, including dynamically varying application contents related to user-interest items external to but geographically proximate to networks visited by the mobile device.

18. The method of claim 1, further including providing said network information as specific network information unknown to said mobile enabling said mobile to authenticate with said network.

19. A mobile device configured to discover network information related to networks to be visited using a knowledge server, comprising:
said mobile device being configured to act as a scout and collect information in or related to the networks it visits as part of its use of the networks, and
said mobile device being configured to share the collected information with other mobiles by reporting the collected information to a knowledge server that maintains accumulated collected information reported by mobiles,
said mobile device being configured to send a query to said knowledge server when said mobile needs some of the accumulated collected information,
further including said mobile device being configured to make information discovery independent of specific networking technologies and network providers by employing an application-layer standard protocol for communications between said mobile device and the knowledge server for information reporting and retrieval,
further including said mobile device being configured to use the knowledge server information to authenticate with a target network before it moves into a coverage area of the target network.

20. The mobile device of claim 19, further including:
said mobile device including a cellular telephone interface and a WiFi network interface,
said mobile device being configured to power off its WiFi interface when the mobile device is currently using the cellular telephone interface and no WiFi network is available, and said mobile device being configured to query the knowledge server to learn that a WiFi network is nearby and to discover information related to the target WiFi network,
said mobile device being configured to use its cellular phone network connection to go through the Internet to authenticate with the WiFi network without having to power on its WiFi interface, and
said mobile device being configured to power on its WiFi interface when it moves close enough to the WiFi network, such that it does not need to perform authentication with the WiFi network during the handoff, thus significantly reducing handoff delay.

21. The mobile device of claim 19, wherein said information in or related to networks includes:
a) device-interest information, including IP addresses of network access points and IP addresses of authentication servers and security type supported by the access points; and
b) user-interest information, including dynamically varying application contents related to user-interest items external to but geographically proximate to networks visited by the mobile device.

22. The mobile device of claim 19, wherein said network information includes specific network information unknown to said mobile device enabling said mobile device to authenticate with said network.

* * * * *

UNITED STATES PATENT AND TRADEMARK OFFICE
CERTIFICATE OF CORRECTION

PATENT NO. : 7,768,982 B2  
APPLICATION NO. : 11/531736  
DATED : August 3, 2010  
INVENTOR(S) : Zhang et al.

Page 1 of 1

It is certified that error appears in the above-identified patent and that said Letters Patent is hereby corrected as shown below:

Title Page, in Item (73), under "Assignees", in Column 1, Line 2, delete "Piscataway;" and insert -- Piscataway, NJ (US); --, therefor.

Title Page, in Item (73), under "Assignees", in Column 1, Line 3, delete "Piscataway" and insert -- Piscataway, NJ (US) --, therefor.

In the Specification

In Column 4, Line 54, delete "Evaluatoin" and insert -- Evaluation --, therefor.

In Column 8, Line 8, delete "information." and insert the same at Line 7, after "sensitive", as a continuation point.

In Column 9, Line 30, delete "MTI" and insert -- MT1 --, therefor.

Signed and Sealed this  
Eleventh Day of November, 2014

Michelle K. Lee  
*Deputy Director of the United States Patent and Trademark Office*